United States Patent
Kumar

(10) Patent No.: US 7,716,274 B1
(45) Date of Patent: May 11, 2010

(54) STATE DATA PERSISTENCE IN A DISTRIBUTED COMPUTING ENVIRONMENT

(75) Inventor: Ajay Kumar, Bangalore (IN)

(73) Assignee: Oracle America, Inc., Santa Clara, CA (US)

( * ) Notice: Subject to any disclaimer, the term of this patent is extended or adjusted under 35 U.S.C. 154(b) by 1593 days.

(21) Appl. No.: 10/824,099

(22) Filed: Apr. 14, 2004

(51) Int. Cl.
G06F 15/16 (2006.01)

(52) U.S. Cl. ............... 709/203; 709/219; 709/221; 709/224; 709/228

(58) Field of Classification Search ........... 709/203, 709/219, 221, 224, 228; 714/2, 15, 21, 25, 714/27, 39
See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 6,195,682 | B1 * | 2/2001 | Ho et al. | 709/203 |
| 6,385,643 | B1 * | 5/2002 | Jacobs et al. | 709/203 |
| 6,823,356 | B1 * | 11/2004 | Novaes et al. | 709/201 |
| 7,103,600 | B2 * | 9/2006 | Mullins | 707/10 |
| 7,107,340 | B2 * | 9/2006 | Chkodrov et al. | 709/224 |
| 7,254,744 | B2 * | 8/2007 | Dunstan et al. | 714/24 |
| 7,290,172 | B2 * | 10/2007 | First et al. | 714/22 |
| 2003/0236826 | A1 * | 12/2003 | Islam et al. | 709/203 |
| 2004/0088401 | A1 * | 5/2004 | Tripathi et al. | 709/224 |
| 2004/0133659 | A1 * | 7/2004 | Lacey et al. | 709/219 |
| 2005/0188260 | A1 * | 8/2005 | First et al. | 714/25 |
| 2005/0188261 | A1 * | 8/2005 | Goode et al. | 714/25 |
| 2005/0278274 | A1 * | 12/2005 | Kovachka-Dimitrova et al. | 707/1 |
| 2006/0037030 | A1 * | 2/2006 | Kovachka-Dimitrova et al. | 719/328 |

OTHER PUBLICATIONS

"Transparent Persistence: an Introduction to Java Data Objects," Nov. 8, 2002, (10 pages).
Jordan et al., Java Data Objects, O'Reilly, Apr. 2003. (27 pages).
Maggie Biggs, "Java Data Objects: Standard, Simplified Access to Persistent Data," http://archive.devx.com/java/free/articles/jdobiggs/jdob100901-1.asp, 2003, 96 pages).
"Close-up on JDO: A standard for persistence of Java business objects," Feb. 2003, http://www.techmetrix.com/trendmarkers/publi.php?C=EiO2O, (8 pages).
"Transparent Persistence," http://solarmetric.com/software/documentation/2.3.0/jdo_overview_intro_transpers.html, 2002 (1 page).

* cited by examiner

*Primary Examiner*—Michael Won
(74) *Attorney, Agent, or Firm*—Robert C Kowert; Meyertons, Hood, Kivlin, Kowert & Goetzel, P.C.

(57) ABSTRACT

Various embodiments of a system and method for persisting application state data are disclosed. The system may include a server cluster networked to a persistent data store such as a database resident on a backend system. Each server of the cluster may include a server container providing services for one or more applications along with a persistence mechanism. The persistence mechanism may be able to detect changes to the state of an application and persist only the portion of the application state that changed to the remote, persistent data store. In some embodiments, the persistence mechanism may be a Java Data Object (JDO) persistence manager which provides object persistence and transaction support while masking the peculiarities of resource managers for particular databases.

25 Claims, 9 Drawing Sheets

STATE DATA PERSISTENCE IN A DISTRIBUTED COMPUTING ENVIRONMENT

BACKGROUND

1. Field of the Invention

This invention relates to computer systems, and more particularly to the persistence of application state in a distributed container environment.

2. Description of the Related Art

Distributed applications are often implemented as part of commercial and non-commercial business solutions for an enterprise. For example, a company may leverage the use of an enterprise application that includes various databases distributed across multiple computers. Applications of this type, which support E-commerce, typically support hundreds or thousands of sessions simultaneously during periods of peak utilization. For scalability and fault tolerance, the servers running such applications may be clustered.

In some application server cluster implementations state and/or session information for an application running on a server may only be stored locally to that server and therefore, may not be available to any other members of the cluster. Load balancing, in such a clustered system, may amount to nothing more than the round-robin assignment of new sessions to cluster members. Once a particular session is assigned to a given server, all requests associated with that session must be forwarded to assigned server who has sole access to the state data for that session. If the sessions assigned to one server of the cluster generate significantly more requests than the sessions assigned to another member of the cluster, then the actual workload of the two nodes may be disparate and the goal of load balancing within the cluster may not be achieved.

Storing application state data only locally to a given server within a cluster may also have implications in the area of failure recovery. If a server in a cluster fails, state information for the applications running in that server may be lost. Another server in the cluster may be able to take the place of the failed server within the cluster configuration, but may not be able to resume processing the applications from the point where the server failure occurred. For example, client sessions handled by the failed server may have to be restarted from an initial point. If one or more users have spent non-negligible time/effort in promoting their sessions to the state at which the server failed, the need to restart these sessions from scratch may be highly unsatisfactory. One solution to this problem may be to persist application state information to a persistent store that can be accessed by multiple cluster members Typically, application state persistence is achieved through serialization. Serialization allows an object graph to be serialized into a stream, which can be associated with a file. An instance is serialized by passing it as a parameter to the writeObject method of ObjectOutputStream. The entire graph of objects reachable from the instance in then serialized into the stream. The object graph is later reconstructed by de-serializing the data from an ObjectInputStream.

Serialization lacks features that may be desirable for distributed application systems. For example, there is no support for transactions. Without concurrency control, there is nothing to prevent multiple application component instances from serializing to the same file, thus corrupting state data. Serialization also lacks the ability to perform queries against the data. The granularity of access is an entire object graph, making it impossible to access a single instance or subset of the serialized data. Serialization includes no mechanism to determine when persistence updates should be performed. It therefore falls to the application developer to code the invocation points for serialization. Typically, this is done upon each request and results in large and for the most part unnecessary transfers of data among cluster members. Serialization and the corresponding storing of data can be very time consuming operations.

Also, a single serialization typically, cannot store all the data needed by an application. Applications must manage multiple serializations, either in the same file or in multiple files. Serialization lacks support for identity and the coordinated management of the instances in storage and memory. Therefore, developers must take extreme care to avoid storing and loading redundant instances. If different parts of a large application read the same serialization more than once, multiple copies of this instance will reside in memory. Redundant copies would make the coordination of separate updates extremely difficult. These issues collectively produce a high level of complexity, which often results in a lack of maintainability and can constrain scalability, which is crucial to most enterprise applications.

SUMMARY

Various embodiments of a system and method for persisting application state data are disclosed. The system may include a server cluster networked to a persistent data store such as a database resident on a backend system. Each server of the cluster may include a server container providing services for one or more applications along with a Java Data Object (JDO) persistence manager. The JDO persistence manager may be able to detect changes to the state of an application and persist only the portion of the application state that changed to the remote, persistent data store in response to the change. In some embodiments, the JDO persistence manager may provide object persistence and transaction support while masking the peculiarities of resource managers for particular databases.

Application state data may be used to track the current process and/or environmental state of an application. For example, the application state data to be persisted may include session state data. A session may be a series of requests to an application component, originating from the same user at the same browser. Sessions may allow applications running in a container to keep track of individual users. For example, an application component might use sessions to provide "shopping carts" to online shoppers. Suppose the application component is designed to record the items each shopper indicates he or she wants to purchase from a Web site. It is important that the application component be able to associate incoming requests with particular shoppers. Otherwise, the application component might mistakenly add Shopper#1's choices to the cart of Shopper#2.

In some embodiments, the servers included in a cluster may be web servers, which provide web pages to clients. The clients may communicate with the web servers using hypertext transfer protocol (HTTP). Each server may include a Java Server Pages (JSP) servlet for providing the web pages to the clients and may require the persistence of HTTP session data. In other embodiments, the servers included in a cluster may be application servers. An application server may run one or more applications, which perform a variety of functions based on user requests. The applications and their components may take the form of Java Beans and application state data may include one or more session beans or other state objects.

In some embodiments, the persistence mechanism may include a JDO-style write barrier to detect changes in the state of an application. A JDO enhancer may operate on state object classes along with information provided in a metadata file to determine which objects need to be persisted. The enhancer may generate an accessor/mutator method for each persisted object. Anywhere a load/modify/store operation on an object is found, it may be replaced with calls to the corresponding accessor or mutator methods. Accessor methods may cause the JDO runtime to get the latest version of the object from the persistent store, while mutator methods may change the values of associated variables and perform other functions to insure that the updated values are properly reflected in the persistent database. In another embodiment, one or more accessor methods may be combined within a single method. The persistence mechanism may initiate a transaction with a database on a backend system where the state data of application is being persisted. The result of this transaction may be that only the value of the changed state element is altered in the backend data store.

A server cluster in which session data is persisted to a remote, persistent backend data store may be made fault tolerant. When the failure of a cluster node is detected, one or more functional nodes may be selected to take over the application processing that was being done by the failed node. The selected surrogate nodes may access the failed node's application state data (e.g. session data) from the remote persistent data store and resume processing the failed node's applications.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
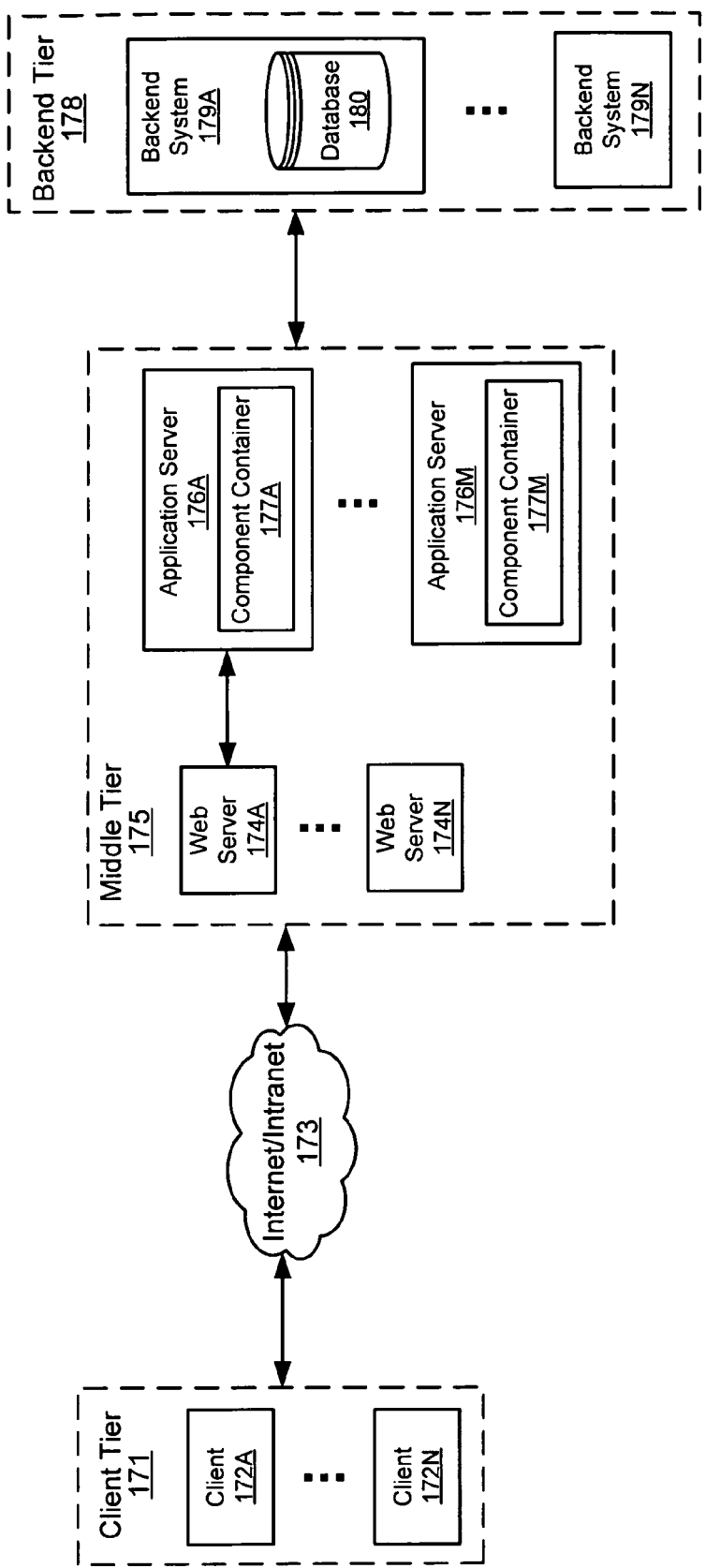
FIG. 1 illustrates a three-tier architecture of a computer system, suitable for implementing various embodiments.

FIG. 1 illustrates a three-tier architecture of a computer system, which may be suitable for implementing various embodiments of the disclosed invention. The application logic of the computer system may be divided into application components (e.g., applets, servlets, server pages, beans, application clients, database objects) according to function, and the various application components may be installed on different computers depending on factors such as security and load distribution. Tiers (e.g., client tier 171, middle tier 175, backend tier 178) may represent the logical or physical organization of the application components, which may operate across one or more different computers. The different computers may be based on different platforms and architectures. In one embodiment, the application components of the computer system may be based on a three-tier architecture. In other embodiments, the application components of the computer system may be based on a two-tier or N-tier architecture.

Client tier 171 may include a number of different clients 172A through 172N (e.g., device, system, user interface) communicating to application components (e.g., servlets, server pages, beans) in the middle tier 175 via the Internet/Intranet 173. The middle tier 175 may include a number of different Web servers 174A through 174N and/or application servers 176A through 176N. In some embodiments, an application server 176 may include functionality typically provided by a Web server 174. For example, functionality provided by a Web server 174 may be included in an application server 176 eliminating the need for the Web server 174. The backend tier 178 may include a number of different computer systems 179A through 179N including data resources such as database 180.

Application components may communicate using different types of protocols and technologies such as HyperText Transfer Protocol Secure sockets (HTTPS), Java™ Database Connectivity (JDBC), Java Naming and Directory Interface (JNDI), eXtensible Markup Language (XML) and/or Simple Object Access Protocol (SOAP). The application components within a tier typically communicate with remote application components in an adjacent tier. For example, multiple users with access to an application component configured to operate in a client tier 171 (e.g., application client accessible via a Web browser) may initiate requests (e.g., application program call) to each remote application component configured to operate in a middle tier 175. Each application component in the middle tier 175 may, in turn, initiate requests to the backend tier 178 on behalf of the application component in the client tier 171. For example, an application component in the middle tier 175 (e.g., bean) may receive a remote request from a Web browser operating in the client tier 171 and in response access an application component (e.g., database object) operating in the backend tier 178. The application component in the backend tier 178 may then provide a response to the application component in middle tier 175 which may complete the remote request.

Some of the application components operating within the middle tier 175 may be configured to run within a component container 177 provided with an application server 176A. Some standard services (e.g., security, transaction management, state management, multi-threading) may be built into a platform and provided automatically to the application components via the container 177 and/or application server 176A. State management may include the persisting of application state data.

Application server functionality may be organized around the concept of containers 177, which provide groupings of related functions. Containers may typically be layered on top of the Java 2 Standard Edition (J2SE) platform, which may include a Java Virtual Machine (JVM) and the corresponding suite of APIs. For instance, the two application server-based containers may be the Web container and the Enterprise Java-Beans (EJB) container. Web containers may be used to support Web-based user interface components, such as Servlets and Java Server Pages (JSP). EJB containers may be used to support business components, which include Session Beans, Entity Beans, and Message-driven Beans. Session Beans may provide access to independent business components in two flavors: Stateful Session Beans, used when state information is required between service calls, and Stateless Session Beans, used when individual service calls are independent of each other and may not require state information to be preserved.

In addition to the core container application programming interfaces (APIs), application servers may provide additional support to APIs such as naming and directory services (JNDI), database connectivity (JDBC), messaging (JMS), XML processing (JAXP), transactions (JTS), and connectivity to legacy systems (JCA). Most application servers may also provide the ability to transparently cluster multiple containers in order to enable fault tolerance and multi-node scalability. In order to provide runtime support for this comprehensive set of functionality, application servers may need to implement a number of key services, including state management, life-cycle management, thread pooling, transactions, security, fault tolerance, load balancing, and persistence.

Figure 2:
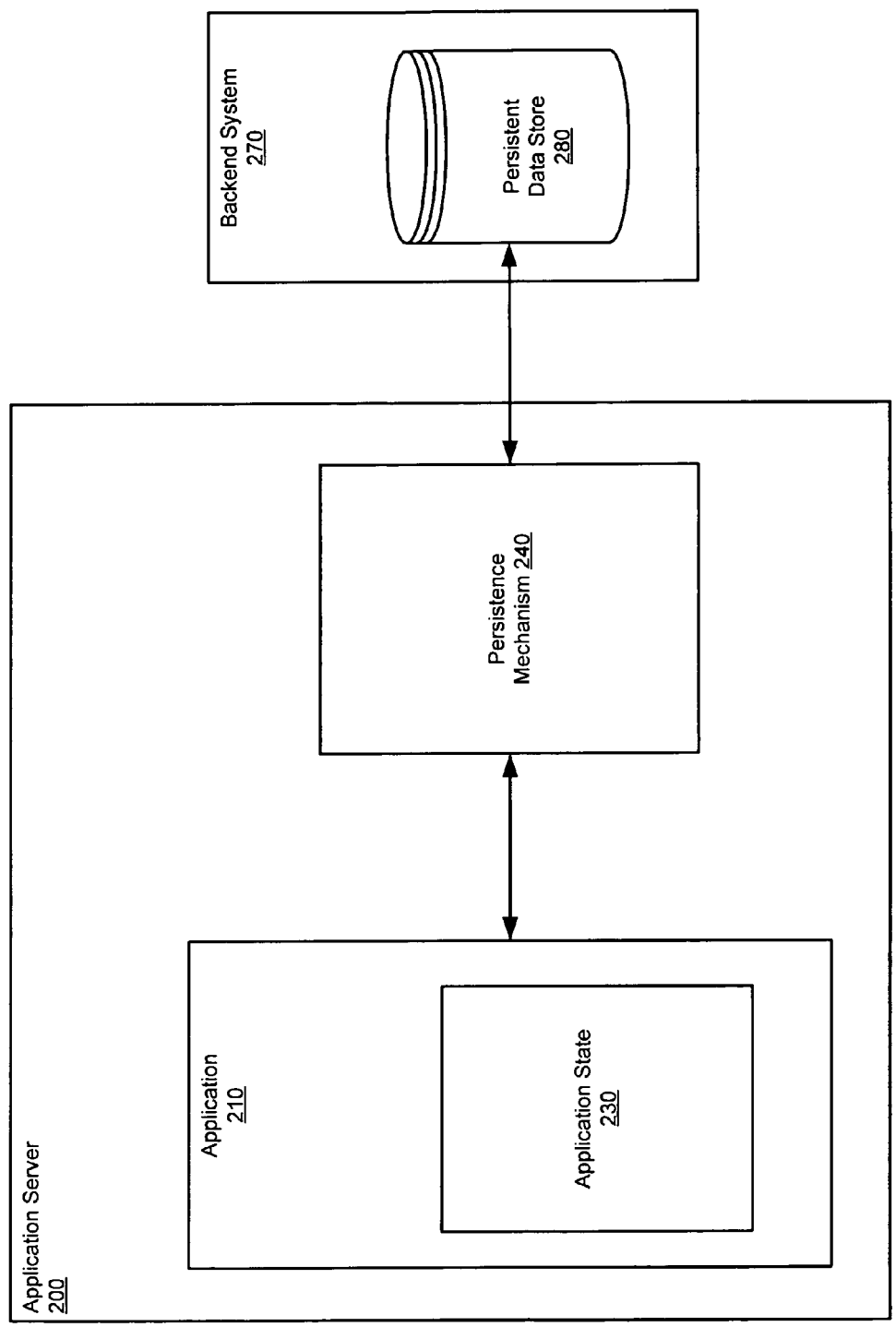
FIG. 2 illustrates components of an application server and backend system, according to one embodiment.

FIG. 2 illustrates components of an application server 200 and backend system 270, according to one embodiment. Application servers may provide a foundation for developing and deploying enterprise applications. They may implement a large collection of Application Program Interfaces (API) and a set of capabilities such as those specified in the J2EE suite of standards, which support the development of multi-tier applications. Among the capabilities provided by the application server may be a mechanism 240 for persisting application state data 230 to a persistent data store 280, which is accessible by multiple members of an application server cluster. Application state data may include session data such as for HTTP sessions and/or session beans. Making application state data 230 available to some or all members of an application server cluster may facilitate load balancing and/or application server fail-over, in some embodiments. For example, if multiple application servers have access to the state data of a given session, "non-sticky" forms of load balancing may be used within the cluster to avoid individual node bottlenecks, as explained in detail below. Also, if session state data is available to only one server and that server experiences a failure, all the data for the sessions being serviced by that server may be lost and these sessions may need to be restarted from scratch. With session state data available to multiple cluster nodes, the sessions being serviced by an application server which fails, may be taken over by one or more other nodes in the cluster with little, or perhaps no impact on the end user.

Persistence functionality may be provided to an application component by a persistence mechanism 240 that may be provided as a service of the application server 200. The persistence mechanism may provide for persisting individually specified fields of the application state 230. The persistence mechanism 240 may also persist only those of the specified fields of the application state 230 whose values have changed since the last persistence transaction. The persistence mechanism 230 may detect the mutation of any of the specified fields of the application state 240. In one embodiment, the persistence mechanism 230 may make use of Java Data Object (JDO) servers provided by the application server. In one embodiment, application state objects may be enhanced for persistence with a JDO-style write barrier as described in detail below. In other embodiments, persistence mechanisms other than based on JDO may be used.

Figure 3:
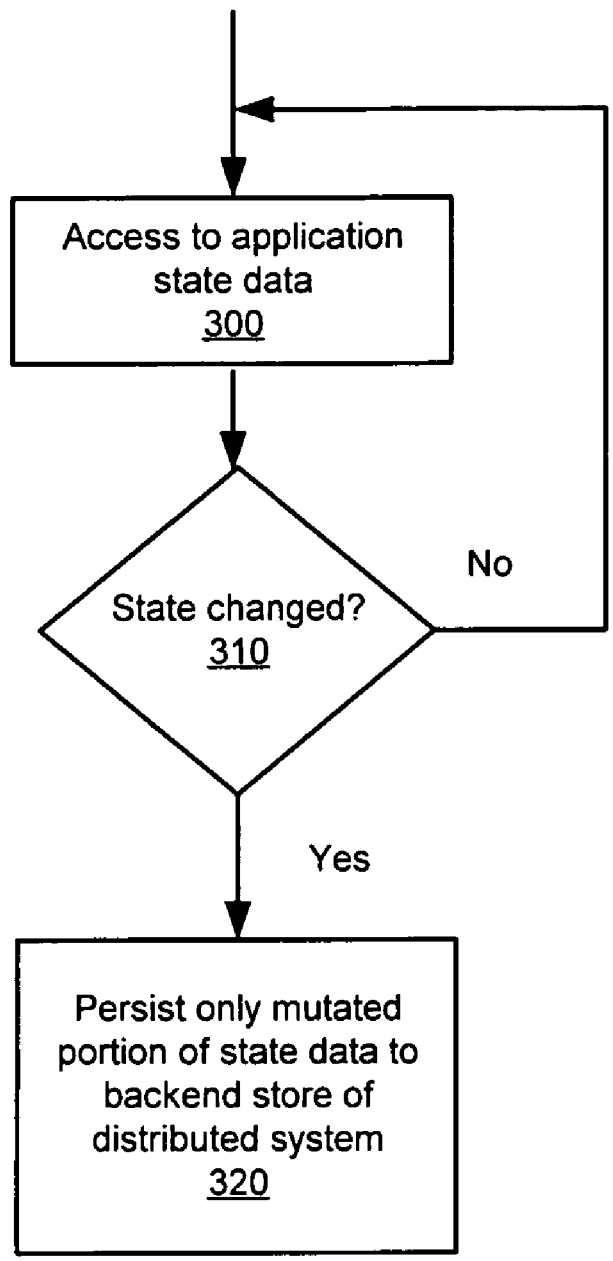
FIG. 3 is a flowchart of one embodiment of a method for persisting application state data.

FIG. 3 is a flowchart of a method for persisting application state data, according to one embodiment. Application state object classes may be enhanced, e.g. using Java Data Objects (JDO), to include methods to persist modified variables. In one embodiment, all state data associated with the application may be designated for persistence to the backend store, while in another embodiment only certain elements of the application state may be so designated. The application state may be represented in certain objects such as session beans or objects storing HTTP session data. These objects may be enhanced so that the persistence mechanism may operate on these objects. In one embodiment, the state data to be persisted is specified using JDO. The persistence mechanism may have the flexibility to persist as much or as little data as is appropriate for any given application.

When application state data is accessed, as shown at 300, a determination may be made as to whether the access causes a change in the application state data, as shown at decision block 310. For example, a read operation may not alter the state data, whereas a write or load-modify-store operation may. At block 320, only that portion of the application state data that is changed by the access may be persisted to the backend store of the distributed system. For example, if the access writes to one element of the application state data object the persistence mechanism may initiate a network transmission to a database on the backend system where the application state data is being persisted to update the value of only that single element that was changed in the database, instead of persisting the entire state object to the database. As mentioned above, in one embodiment the persistence mechanism may implement this method by employing a JDO-style write barrier.

Figure 4:
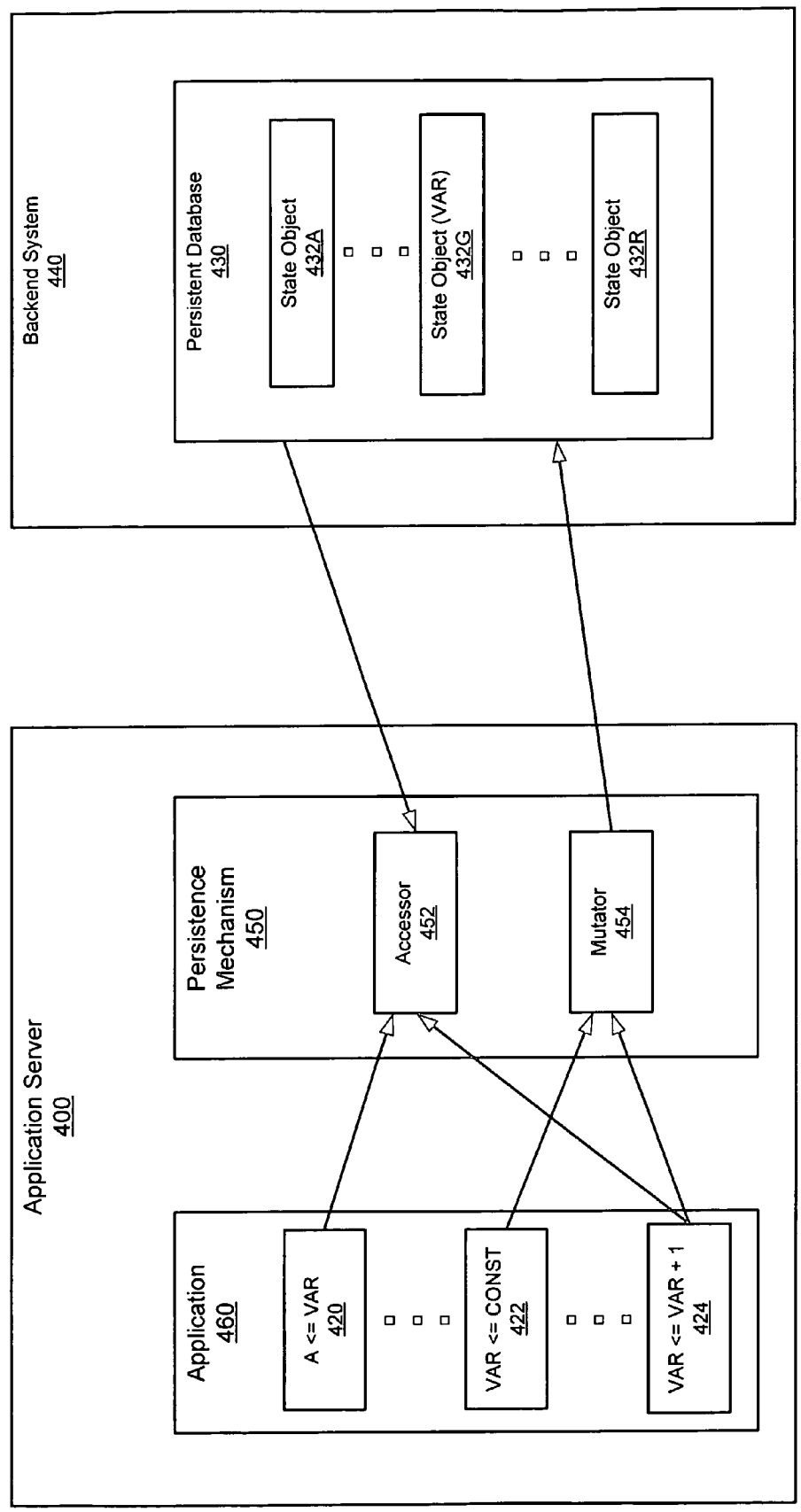
FIG. 4 illustrates a JDO-style write barrier, according to one embodiment.

FIG. 4 illustrates a JDO-style write barrier, according to one embodiment. Application 460 running on application server 400 may be enhanced to make use of JDO persistence services through persistence mechanism 450. JDO enhancement may include generation of an accessor 452 and/or mutator 454 method for each application state object to be persisted. At each point in the application where a persisted object is either loaded, modified, or written the code may be augmented to include the invocation of the appropriate corresponding accessor and/or mutator. For example, in case of an assignment statement 420 in which the value of a persisted object, VAR, is copied to another location, the enhanced code may call accessor 452 to get the current value of VAR. Accessor 452 may access persistent database 430 on backend system 440 in order to obtain the most current value of VAR from persisted application state data 432. In this case, VAR may be stored in state object 432G within persistent database 430.

As another example, assignment statement 422 may attempt to write a constant value into VAR. Since the value of VAR is to be overwritten, it may not be necessary to obtain the most current value for VAR in this case. The enhanced code may call mutator 454 to write the update value of VAR to persistent database 430. As a final example, statement 424 may attempt to increment the value of VAR. In this case it may be necessary to both obtain the current value of VAR and update the value of VAR in the persistent database. Therefore, both accessor 452 and mutator 454 may be invoked in this instance.

Figure 5:
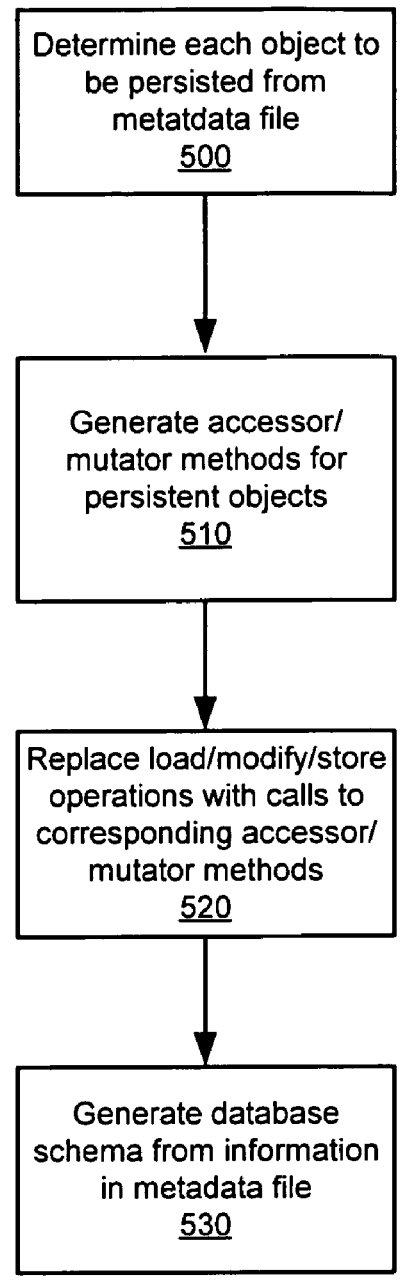
FIG. 5 is a flowchart of a method for enhancing classes to persist application state data upon mutation, according to one embodiment.

FIG. 5 is a flowchart of a method for enhancing classes to persist application state data upon mutation, according to one embodiment. A metadata file may classify application state objects as to persistent or non-persistent as well as a database schema describing how the objects are to be stored within the database. At block 500, the enhancer (a JDO enhancer in one embodiment) may use the metadata file to determine which objects need to be persisted. The enhancer may generate an accessor/mutator method for each persisted object, as indicated by block 510. In one embodiment, encountering a modifiable variable, field, may cause the enhancer to generate a method called modify_field( ) for example. In addition to performing the required modification to the variable, the method may generate and event into the persistence mechanism (e.g. which may include JDO infrastructure) informing it of the modification. Upon receiving this mutation notification, the JDO runtime, for example, may in one case simply note the modification for reference until a current transaction is committed, or in another case may immediately generate a message to the persistent database to update the value of the variable. Thus, only portions of state objects are mutated need be transmitted to the persistent store.

Likewise, anywhere a load/modify/store operation on an object is found the enhancer may replaced such and operation with calls to the corresponding accessor or mutator methods, as shown in block 520. Accessor methods may cause the JDO runtime, for example, to get the latest version of the object from the persistent store, while mutator methods may change the values of associated variables and perform other functions to insure that the updated values are properly reflected in the persistent database. At 540 the enhancer may use information included in the metadata file to produce a database schema that describes how all class objects are to be persisted in the database.

Figure 6:
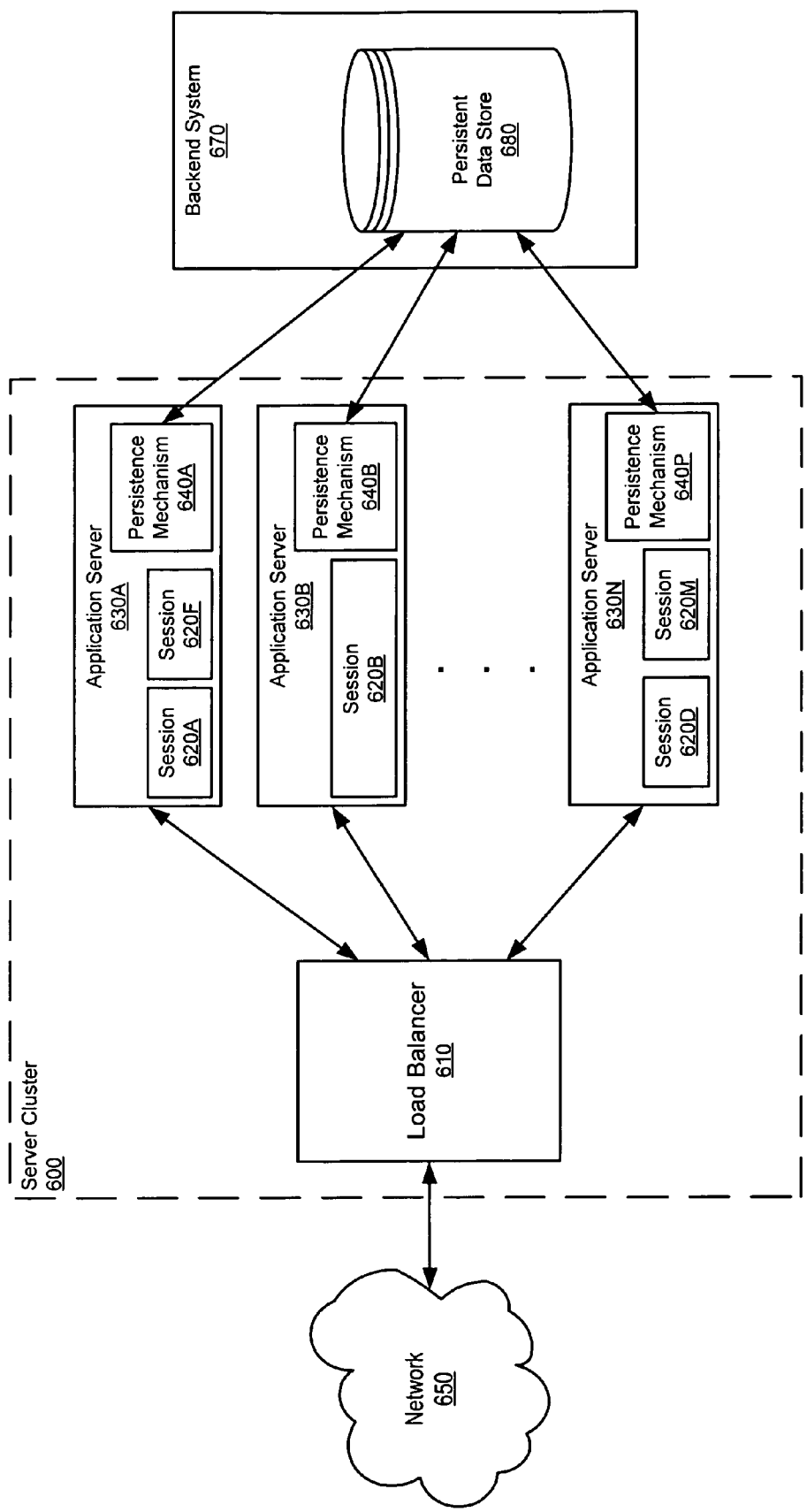
FIG. 6 illustrates components of a server cluster, according to one embodiment.

FIG. 6 illustrates components of a server cluster 600, according to one embodiment. In one embodiment each application server 630 may be running the same application. In the general case, some subset of the application servers 630 may be running a particular application component at any given time. Application components may process related requests from a particular client in the form of a session. A session may be a series of requests to an application component, originating from the same user at the same browser. Sessions may allow applications running in a container to keep track of individual users. For example, an application component might use sessions to provide "shopping carts" to online shoppers. Suppose the application component is designed to record the items each shopper indicates he or she wants to purchase from a Web site. It is important that the application component be able to associate incoming requests with particular shoppers. Otherwise, the application component might mistakenly add Shopper#1's choices to the cart of Shopper#2.

An application component may distinguish users by their unique session IDs. The session ID may arrive with each request. If the user's browser is cookie-enabled, the session ID may be stored as a cookie. As an alternative, the session ID may be conveyed to the application component by uniform resource locator (URL) rewriting, in which the session ID is appended to the URL of the application component or Java Server Pages (JSP) file from which the user is making requests. For requests over HTTPS or Secure Sockets Layer (SSL), another alternative is to use SSL information to identify the session.

In a distributed application, the component running in the middle tier (application server) may require a great deal of computational resource due to the generation of a large number of requests from the client tier components. To meet these needs, the middle tier component may be replicated several times with each instance running in its own application server within a clustered environment. In a clustered environment, the same application may exist on each of the servers with each server handling a group of sessions. A load balancer 610 may distribute the total workload among members of the cluster. A clustered environment may require an affinity mechanism associated with the load balancer 610 such that all requests for a particular session are directed to the same application server instance in the cluster. A cluster employing such an affinity mechanism may be said to have "sticky" sessions in the since that requests associated with a particular session will "stick" (be forwarded) to a single server.

Making a client session sticky to a single server may turn the server into a performance bottleneck. If the server undergoes an excessive load, and thus responds slowly, the user experience may degrade. In addition, it is entirely possible that a majority of abnormally active users may coincidentally be routed to a single server, overburdening that server more than its counterparts. A solution to this type problem may be to persist the sessions' state data in a commonly accessible data store. In such a case, the load balancer 610 may receive session requests from clients over network 650 and distribute them to the application servers 630 based solely on workload. For example, load balancer 610 may receive a request associated with session 620D and forward it to application server 630B because it has the lightest workload. Application server 630B may not have any session state data for session 620D or the state data that it does have may not be current. If the previous request associated with session 620D were processed by a different cluster node, then the current state data for that session may reside only in that node and in the persistent data store 680. In either case it may be necessary for application server 630B to access the current state of session 620 from persistent data store 680. Therefore it may be extremely important for each node to synchronize state data for each session they are processing to persistent data store 680 coincident with any change to the data.

Figure 7:
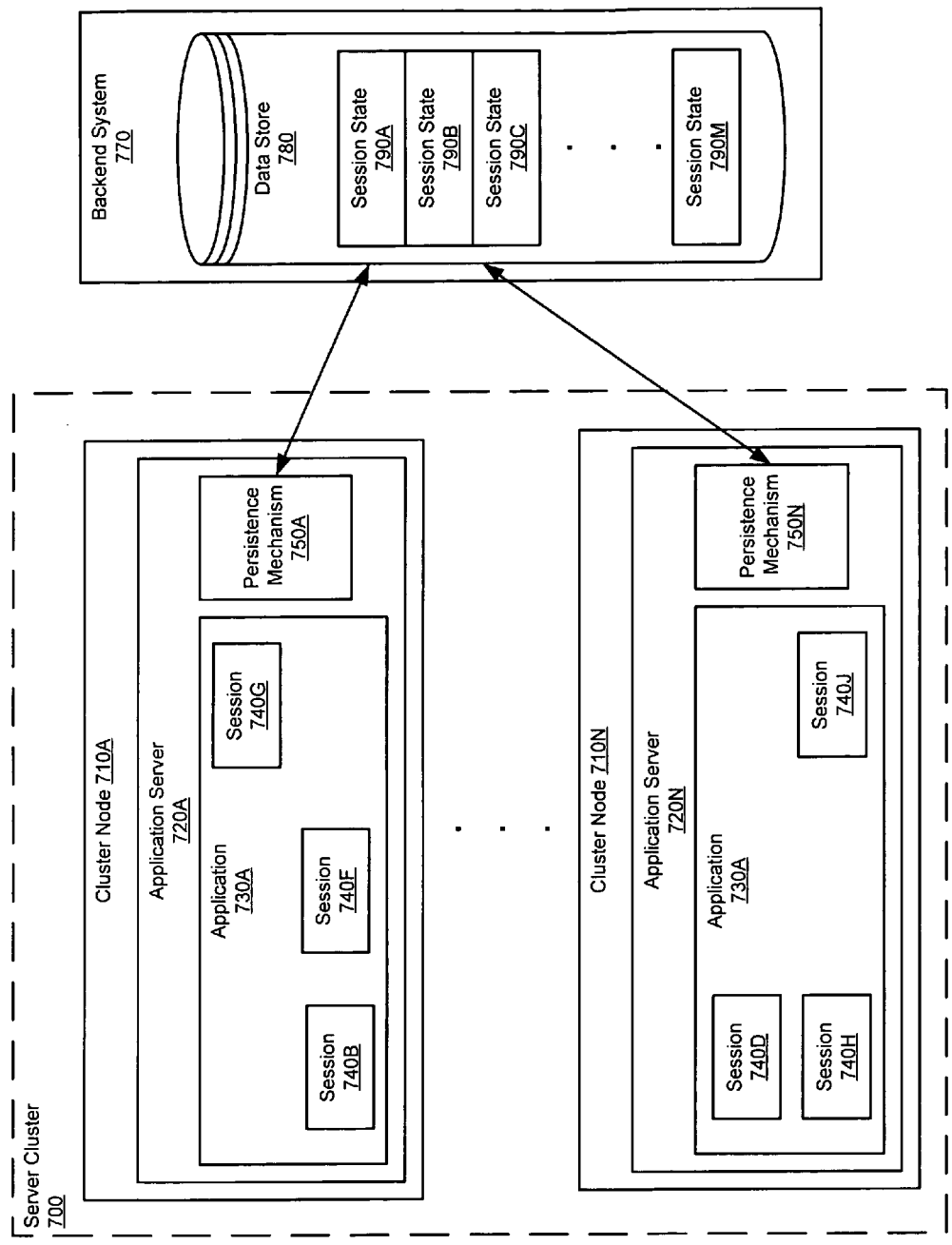
FIG. 7 illustrates a server cluster in which each node may include a JDO persistence mechanism, according to one embodiment.

Persisting session state data to a highly available data store accessible to multiple members of an application server cluster may allow for a graceful fail-over of sessions from a failed node to one or more of the other nodes of the cluster. FIG. 7 illustrates the components of such a clustered system including a JDO persistence mechanism, according to one embodiment. JDO persistence mechanism 750 may monitor sessions 740 under an application 730 for state changes using techniques described previously with respect to the JDO-style write barrier. In response to a change of state of any session 740, the JDO persistence mechanism 750 may persist only the session state changes to the copy of the session state 790 stored in the data store 780 on backend system 770. This stored copy of the session state data may be accessible to all nodes 710 of the cluster 700.

In the case of the hardware failure of a cluster node 710A, it may be possible for requests from that server's sessions to be rerouted to another server or servers in the cluster 700 in which the same application component installed. The new server 720N may be able to access session data 740B, 740F, and 740G from the commonly accessible persistent data store 780. If the JVM fails during the writing of session state data associated with session 740F to the session database 780, the update to the database may not get committed. In this case the commonly accessible persistent store 780 may roll back the session data to a point prior to the initiation of the persist transaction. The surrogate application 730A running on application server 720N may access the rolled-back session state 790F from the persistent store 780 and recover the session with minimal impact to the user. If the server fails between persistence transactions, the transition of the session from the failed unit to the surrogate may only be noticeable to the user as a delay in processing of one phase of a transaction, without the loss of any data.

Figure 8:
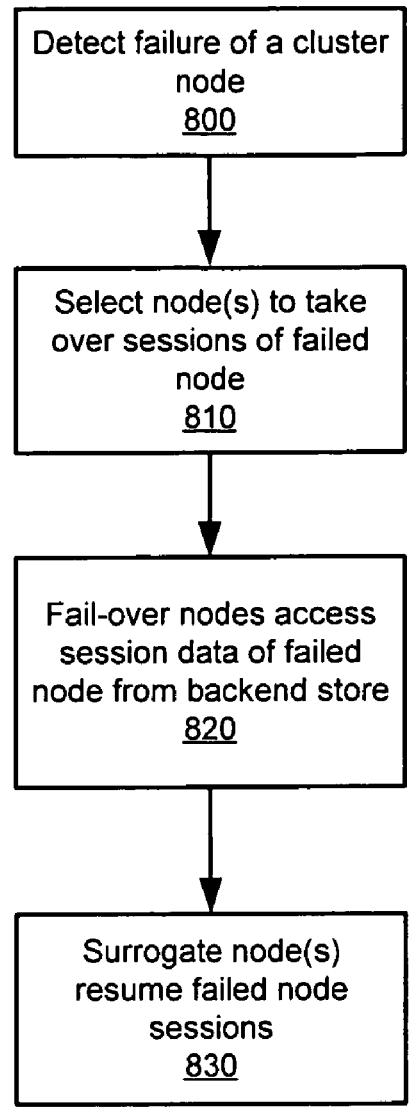
FIG. 8 is a flowchart of a method for recovering sessions from a node failure in an application server cluster, according to one embodiment.

Persisting application state data to a persistent data store remote from the server on which the application executes may allow for the recovery of the application in the event of server failure. FIG. 8 is a flowchart of a method for recovering sessions from a node failure in an application server cluster, according to one embodiment. At block 800, the cluster may detect the failure of one of its constituent nodes. There are many possible methods that may be implemented for detecting node failures within a cluster. In one embodiment, a Domain Administration Server may monitor the health of all application server instances. This may be done in a variety of ways such as having each instance generate a message (heartbeat) to the Domain Administration Server with a given periodicity. Detection of a failed application server instance may be denoted by the absence of its heartbeat. In another embodiment, the Domain Administration Server may poll each application server instance periodically to determine its health. Failure to respond to the poll may indicate a failure of the polled instance. Once a failure is detected, the Domain Administration Server may select one of the other cluster instances to recover the downed server's sessions, as indicated in block 810.

In another embodiment, the method for detecting a non-restarting server may not involve a Domain Administration Server. The application server instances may be responsible for monitoring one another. When they detect a loss of cluster membership that does not restart within a given time interval, another instance may be determined by a simple selection algorithm (e.g. the server instance whose ID is greater than and closest to that of the downed server) to recover the downed server's sessions, as indicated in block 810.

Regardless of the specifics of the failure detection mechanism or the fail-over node(s) selection process, the surrogate application server instance may initiate a transaction with the highly available storage to obtain the current state data for the sessions being processed by the failed node, as shown in block 820. The load balancer may begin forwarding requests associated with sessions that were running on the failed node to the surrogate node(s), and the surrogate node(s) may begin processing the session requests based on the session state data obtained from the last updates of the failed node in the persistent data store, as illustrated in block 830.

Figure 9:
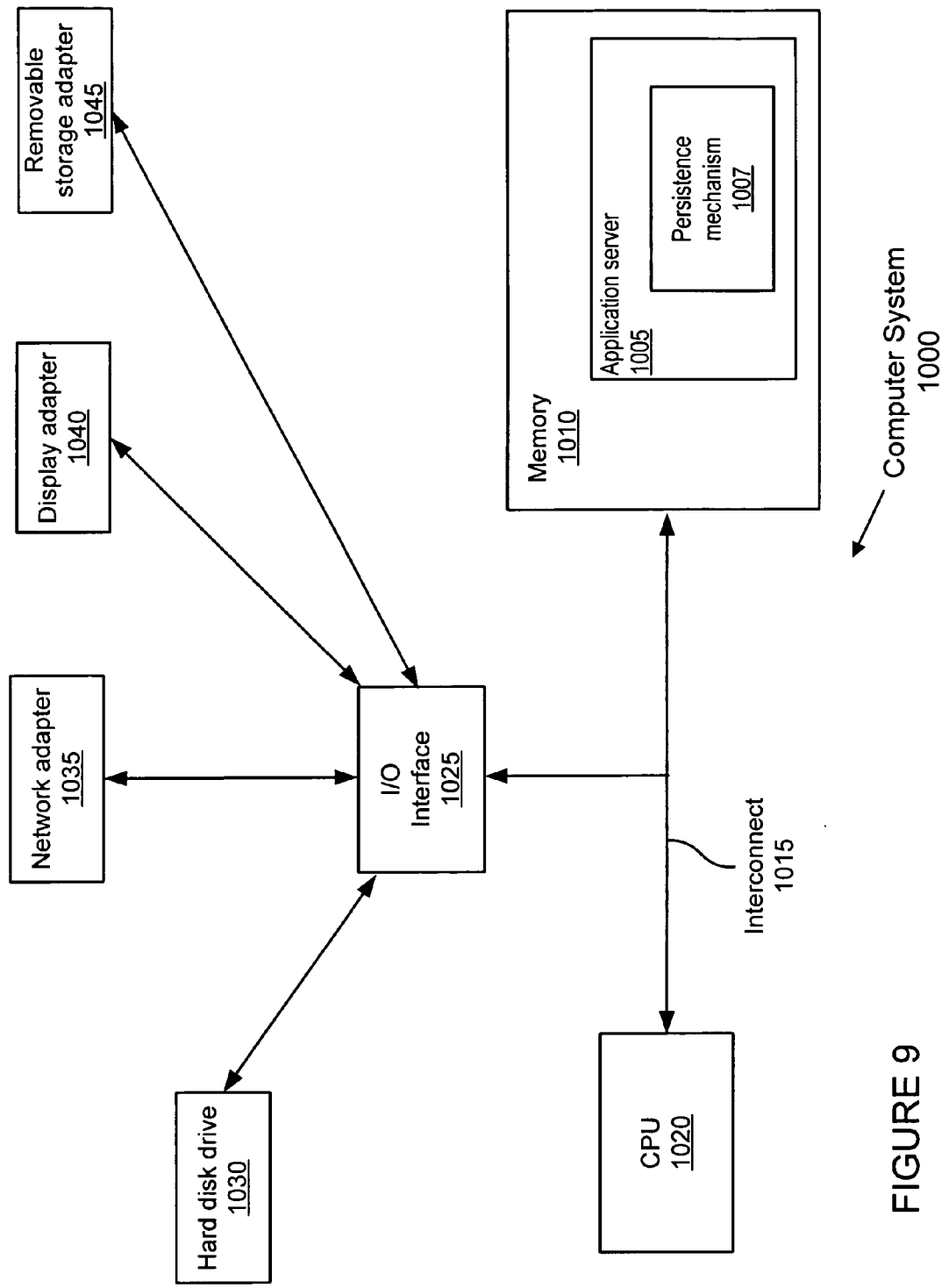
FIG. 9 illustrates an exemplary computer system according to one embodiment.

FIG. 9 illustrates one embodiment of a computer system 1000 that may include a persistence mechanism 1007 as a component of application server instance 1005. Computer system 1000 may be a node in an application server cluster. Computer system 1000 may include many different components such as memory 1010, a central processing unit (CPU) or processor 1020, and an input/output (I/O) interface 1025. Interconnect 1015 is relied upon to communicate data from one component to another. For example, interconnect 1015 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1000 preferably includes a memory medium on which computer programs according to various embodiments may be stored. The term "memory medium" may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1030, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1000 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1010 may store program instructions accessed by the CPU 1020. For example, instructions and data implementing an application server 1005 may be stored in memory 1010. Application server 1005 may include one or more applications, data sources, data source proxies, transaction managers, and/or a data source ID manager.

Computer system 1000 may further include other software and hardware components, such as an input/output (I/O) interface 1025, that may be coupled to various other components and memory 1010. The CPU 1020 may acquire instructions and/or data through the I/O interface 1025. Through the I/O interface 1025, the CPU 1020 may also be coupled to one or more I/O components. As illustrated, I/O components may include a hard disk drive 1030, a network adapter 1035, a display adapter 1040 and/or a removable storage adapter 1045. Some components 1030 to 1045 may be coupled to the I/O interface 1025. In addition, the computer system 1000 may include one or more of a particular type of component. The computer system 1000 may include one or more components coupled to the system through a component other than the I/O interface 1025. Some computer systems may include additional and/or other such as application software (e.g., stored in memory 1010), other CPUs, video monitors or other displays, track balls, mice, keyboards, printers, plotters, scanners, or other types of I/O devices for use with computer system 1000.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a server cluster, comprising:
      a plurality of server nodes, wherein each server node comprises:
         a server container;
         one or more applications configured to execute within the server container, wherein the one or more applications are configured to process requests from a plurality of users as sessions, wherein each session comprises a series of requests from a same user, wherein the one or more applications access and modify application state data during the processing of a given one of the sessions, wherein the application state data comprises session state data for the given one of the sessions; and
         a Java Data Object (JDO) persistence manager configured to detect changes to the application state data within the server container and to persist the application state data; and
      a persistent data store coupled to the cluster, configured to store application state
      data of the one or more applications of each respective server container, and configured to make the application state data accessible to each of the plurality of server nodes;
   wherein one of the applications of one of the plurality of server nodes is configured to access from the persistent data store application state data for a session that has previously been processed on another one of the plurality of server nodes;
   wherein in response to detecting a change in application state data within the server container, the JDO persistence manager is configured to persist only a changed portion of the application state data within the respective server container to the persistent data store.

2. The system as recited in claim 1, wherein the JDO persistence manager is configured to persist only mutated application state data to the data store, only in response to mutation of the application state data.

3. The system, as recited in claim 1, wherein the application state data comprises hypertext transfer protocol (http) session data.

4. The system, as recited in claim 1, wherein the application state data comprises a session bean.

5. The system as recited in claim 1, further comprising a JDO-style write barrier configured to detect mutation of the application state data.

6. The system as recited in claim 1, wherein one or more of the applications is configured to function as a distributed application across two or more of the server nodes.

7. The system as recited in claim 1, wherein the plurality of server nodes is configured to detect the failure of a cluster node and recover sessions from a failed node by accessing session state data from the persistent data store.

8. The system as recited in claim 1, further comprising a non-sticky load balancer configured to distribute session requests to server nodes based on server workload, wherein the persistence mechanism is configured to synchronize session data to the persistent store.

9. A system, comprising:
   an application server, comprising:
      an application server container;
      one or more applications configured to execute within the application server container, wherein the one or more applications are configured to process requests from a plurality of users as sessions, wherein each session comprises a series of requests from a same user, wherein the one or more applications access and modify application state data during the processing of a given one of the sessions, wherein the application state data comprises session state data for the given one of the sessions; and
      a Java Data Object (JDO) persistence manager configured to detect changes to the application state data within the application server container and to persist the application state data; and
   a persistent data store coupled to the application server, configured to store application state data of the one or more applications, and configured to make the application state data accessible to the application server and one or more other application servers;
   wherein one of the one or more applications is configured to access from the persistent data store application state data for a session that has previously been processed on one of the one or more other application servers;
   wherein in response to detecting a change in application state data within the application server container, the JDO persistence manager is configured to persist only a changed portion of the application state data within the application server container to the persistent data store.

10. The system as recited in claim 9, wherein the JDO persistence manager is configured to persist only mutated application state data to the data store, only in response to mutation of the application state data.

11. The system, as recited in claim 9, wherein the application state data comprises hypertext transfer protocol (http) session data.

12. The system, as recited in claim 9, wherein the application state data comprises a session bean.

13. The system as recited in claim 9, further comprising a JDO-style write barrier configured to detect mutation of the application state data.

14. A method, comprising:
   a Java Data Object (JDO) persistence manager detecting an access to application state data within a server, wherein application state data is accessed by an application executing on the server during the processing of a given one of a plurality of sessions, wherein the application is configured to process requests from a plurality of users as sessions, wherein each session comprises a series of requests from a same user, wherein the application state data comprises session state data for the given one of the sessions;
   the JDO persistence manager determining whether the access alters the application state, in response to said detecting; and in response to determining that the access alters the application state within the server, the JDO persistence manager persisting only the elements of the application state that are changed by the access to a persistent store that makes the application state accessible to the server and to one or more other servers;

wherein the application is configured to access from the persistent data store application state data for a session that has previously been processed on one of the one or more other servers.

15. The method, as recited in claim 14, wherein the JDO persistence manager persisting comprises persisting only mutated application state data to the data store, only in response to mutation of the application state data.

16. The method, as recited in claim 14, wherein the application state data comprises hypertext transfer protocol (http) session data.

17. The method, as recited in claim 14, wherein the application state data comprises a session bean.

18. The method, as recited in claim 14, wherein said determining is performed by a JDO-style write barrier configured to detect mutation of the application state data.

19. The method, as recited in claim 14, wherein said application state data comprises state data for one or more applications configured to function as a distributed application across two or more server nodes of a cluster.

20. A computer-accessible storage medium storing program instructions, wherein the program instructions are computer-executable to implement a Java Data Object (JDO) persistence manager configured to:

detect an access to application state data within a server, wherein application state data is accessed by an application executing on the server during the processing of a given one of a plurality of sessions, wherein the application is configured to process requests from a plurality of users as sessions, wherein each session comprises a series of requests from a same user, wherein the application state data comprises session state data for the given one of the sessions;

in response to said detecting, determine whether the access alters the application state; and in response to determining that the access alters the application state within the server, persist only the elements of the application state that are changed by the access to a persistent store that makes the application state accessible to the server and to one or more other servers;

wherein the application is configured to access from the persistent data store application state data for a session that has previously been processed on one of the one or more other servers.

21. The computer-accessible storage medium as recited in claim 20, wherein the JDO persistence manager is configured to persist only mutated application state data to the data store, only in response to mutation of the application state data.

22. The computer-accessible storage medium as recited in claim 20, wherein the application state data comprises hypertext transfer protocol (http) session data.

23. The computer-accessible storage medium as recited in claim 20, wherein the application state data comprises a session bean.

24. The computer-accessible storage medium as recited in claim 20, wherein a JDO-style write barrier detects mutation of the application state data.

25. The computer-accessible storage medium as recited in claim 20, wherein said application state data comprises state data for one or more applications configured to function as a distributed application across two or more server nodes of a cluster.

\* \* \* \* \*